April 13, 1937.  G. WILKES  2,077,296
HOUSE TEMPERATURE CONTROLLING APPARATUS
Filed Dec. 24, 1931   3 Sheets-Sheet 3

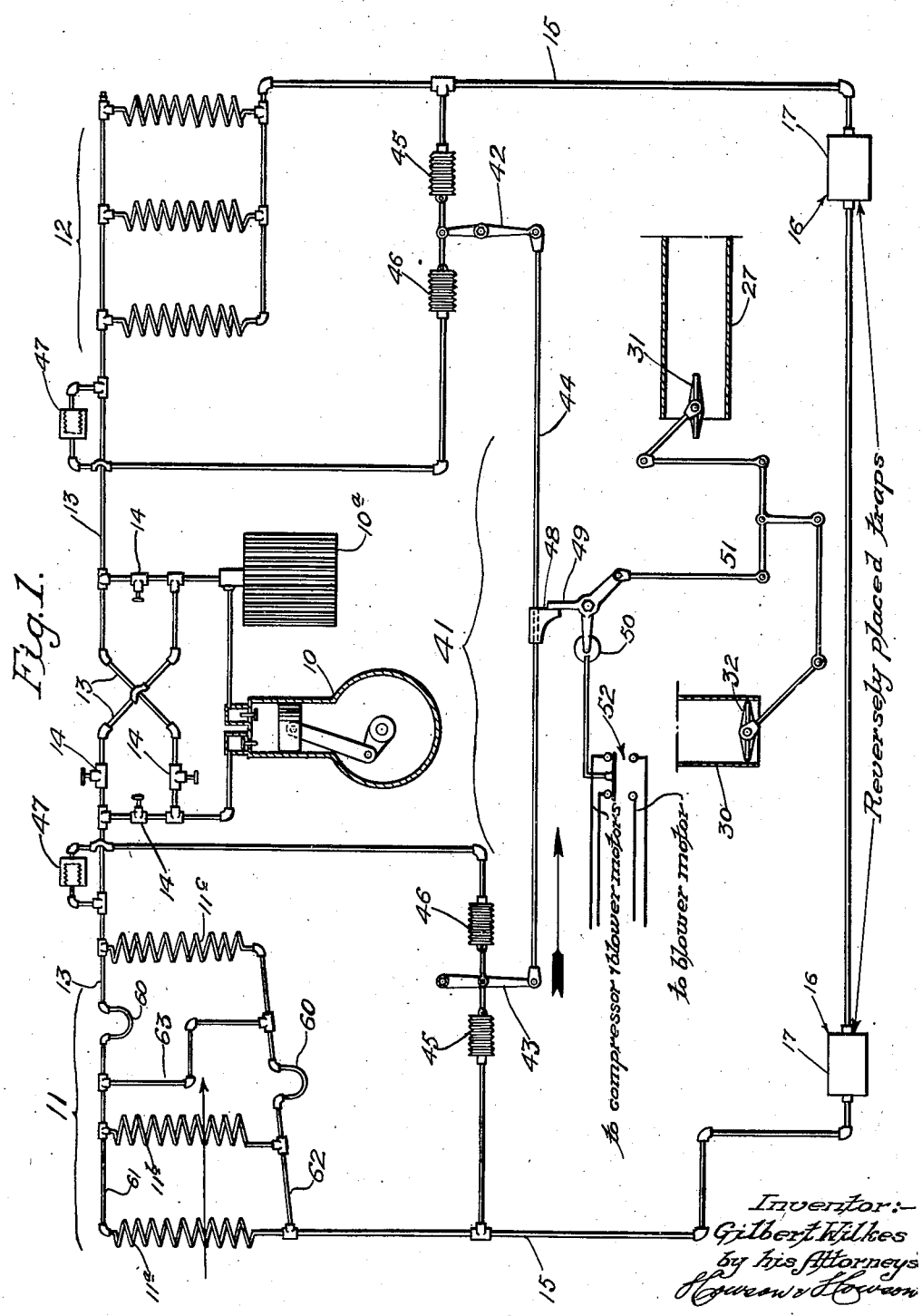

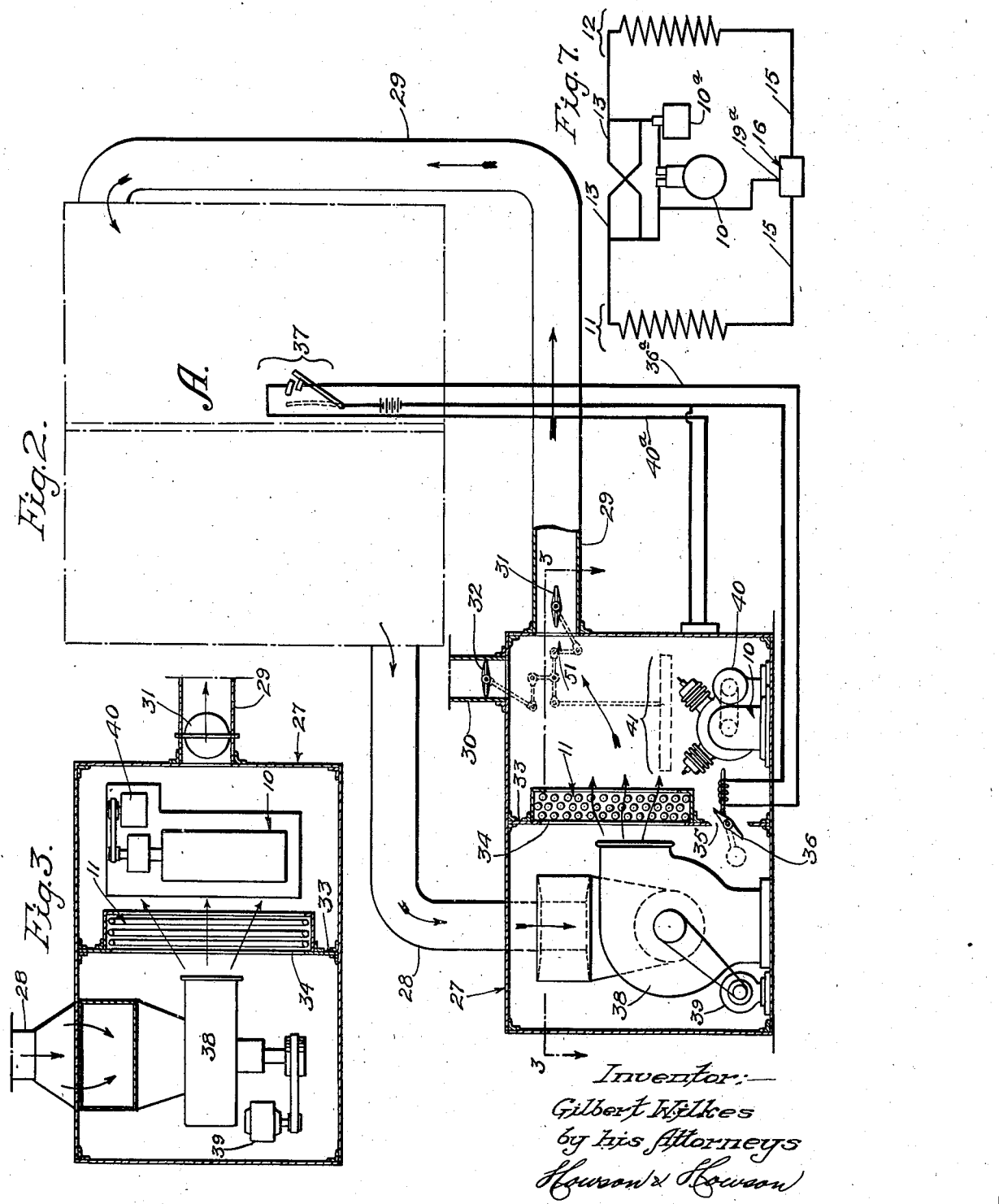

Inventor:
Gilbert Wilkes
by his Attorneys
Howson & Howson

Patented Apr. 13, 1937

2,077,296

UNITED STATES PATENT OFFICE 2,077,296

HOUSE TEMPERATURE CONTROLLING APPARATUS

Gilbert Wilkes, Jacksonwald, Pa., assignor to Wilkes Avery Corporation, New York, N. Y., a corporation of New York Application December 24, 1931, Serial No. 583,125

30 Claims. (Cl. 62—3)

This invention relates to temperature regulating systems, and more particularly to a domestic temperature regulation system whereby desired temperatures may be maintained throughout the year by an adaptation of the Kelvin cycle. It has heretofore been proposed that the Kelvin cycle be employed in the temperature regulation of dwellings but all proposed adaptations of this system for this purpose with which I am familiar are entirely theoretical in their basis and incapable of practical operation as house temperature controlling systems.

An important object of the present invention is the provision of a practically operative system capable of ready installation in dwellings, and likewise capable of economic operation.

A further and more specific object of the invention is the provision in apparatus of this character of a system such that the use of storage tanks is dispensed with, thus enabling operation on a minimum refrigerant supply.

A further object of the invention is the provision of a means for preventing dissemination of toxic or irritating refrigerants employed in the system through the controlled area.

A further and more specific object of the invention is the provision in a refrigerating system of means controlled by the weight of the refrigerant contained in the system for bringing into operation mechanism which will cause fumes, given off from the system in response to refrigerant losses resulting from breakage or extensive leakage, to be discharged to a point where they can cause no damage.

A further object of the invention is the provision of a coil arrangement for use in the heat exchange element of the temperature control system, by which the controlled area is directly affected, of such character that a maximum heat transfer may be effected during operation of the coil in its heating capacity and at the same time a complete function of the coil may be had during those periods when the coil is acting in its cooling capacity.

These and other objects I attain by the construction shown in the accompanying drawings wherein, for the purpose of illustration, I have shown a preferred embodiment of my invention and wherein:

Fig. 1 is a diagrammatic view illustrating a temperature-regulating apparatus constructed in accordance with my invention;

Fig. 2 is a partially diagrammatic vertical sectional view illustrating the manner of connecting the apparatus with an area the temperature of which is to be controlled;

Fig. 3 is a horizontal sectional view through the casing of Fig. 2;

Fig. 7 is a diagrammatic view illustrating a modification of the system of Fig. 1, employing a single trap.

Figure 4:
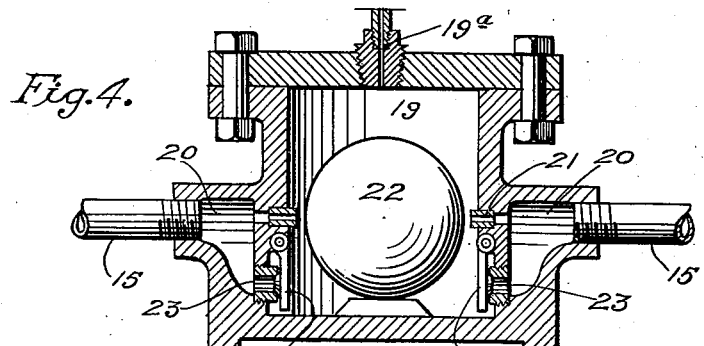
Figs. 4 and 5 are sectional views through traps for use in the refrigerating systems.

Referring now more particularly to the drawings, the numeral 10 generally designates a compressor or heat pump connected between a pair of evaporator-condenser units 11 and 12, the connections being such that the intake of the compressor may be connected with either of the units 11 and 12 and the exhaust with the other thereof so that in the system either unit 11 or 12 may be caused to act as an evaporator and the other as a condenser at will. In the present instance the change-over connections are shown as effected by branch piping 13 and control valves 14. Directly connected with the inlet of the compressor is a slug trap 10—a, this trap being preferably so disposed that it is subjected to the heat developed by the compressor in operation. The remaining terminals of units 11 and 12 are connected with one another through a conduit 15 including trap means 16 for preventing transfer of gas from either of the units 11 or 12 to the other thereof while permitting the transfer of fluids therebetween. This trap mechanism may either comprise a pair of independent traps 17 such as shown in Fig. 1, or a single trap such as suggested in Fig. 7, and shown in detail in Figs. 4 and 5.

Figure 5:
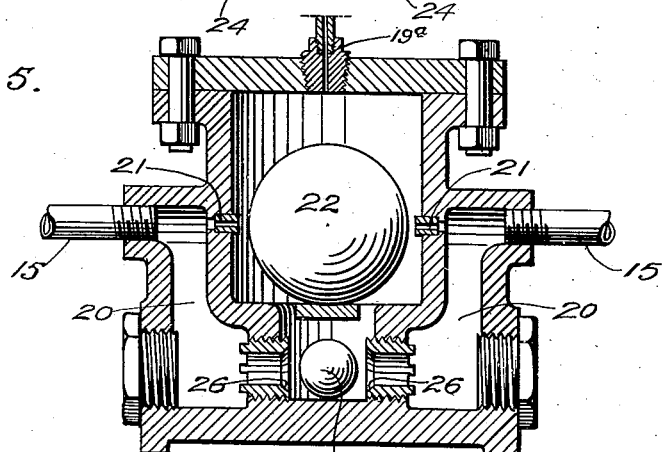

The traps 17 of Fig. 1 may be of any ordinary or usual construction and are arranged back to back; that is to say, the fluid outlets of these traps are in communication with one another. The trap of Fig. 7 effects the same results with a unitary structure and is preferred. It comprises a main chamber 19 having associated therewith opposed chambers 20 each adapted for connection with the conduit leading from one of the evaporator-condenser units 11 and 12. Chamber 19 is in communication with the chambers 20 through orifices 21 controlled by a float ball 22 and is further in communication with the chambers 20 through check-valved passages 23. The valve mechanism controlling the passages 23 may consist either of independent valves 24 associated with these passages as shown in Fig. 4, or a single valve 25 arranged between the inner ends of passages 23 and adapted to coact with valve seats 26 formed on adjacent ends thereof as shown in Fig. 5. In the operation of a trap of this character gas entering through an orifice 21 will tend to force the ball 22 against the other orifice to seal the same. Fluid entering the chamber 19 will cause ball 22 to roll as it elevates the same, thus exposing the orifice formerly sealed thereby and permitting the liquid to be discharged therethrough.

A system of this character is associated with an area A, the temperature of which is to be controlled by placing the evaporator-condenser unit 12 at a point where it is subjected to the outside atmosphere while placing the evaporator-condenser unit 11 in an air circulation system including the area A. In the present instance, this air circulation system is shown as comprising a casing 27 having an inlet 28 and outlet 29 and a stack vent 30, the outlet 29 and stack vent 30 being controlled by suitable damper mechanisms 31 and 32. Within the casing 27 a partition 33 is provided having openings 34 and 35, of which the opening 34 is blocked by the unit 11 so that all air passing therethrough must pass through the unit and the opening 35 is controlled by a damper 36, such damper 36 being in turn controlled by a thermostat 37 disposed in the area A. At one side of this partition and communicating with the inlet is a blower 38 operated by a motor 39 and at the opposite side of the partition is the compressor 10 which is likewise operated by a motor 40. Inlet 28 communicates with the area A and it will, accordingly, be obvious that air withdrawn from the area A is forced through the unit 11 to be heated or cooled thereby in quantities determined by the operation of thermostat 37. The heat resulting from operation of compressor 10 will act to supplement the action of the unit 11 when acting as a condenser and to modify the operation when this unit is operating as an evaporator. The air circulation system might, obviously, likewise include humidity controls if this is found desirable.

It will be obvious that in many instances refrigerants otherwise desirable are dangerous in a system of this character due to the fact that they are either toxic or noxious.

In order that such refrigerants may be employed in the system without danger or inconvenience to occupants of the area A I provide a means 41 controlled by the refrigerant content of the system for controlling the dampers 31, 32 to stop delivery of air circulated through the casing and to discharge the same through the waste stack. In Fig. 1 this means comprises apparatus for weighing the liquid refrigerant in the system and employ the weight of the refrigerant as a means for controlling the operation of the dampers 31 and 32 so that in event of any serious loss of refrigerant the dampers 31 will be closed and the dampers 32 will be opened with the result that air passing through the system is delivered through the stack outlet 30 and permitted to escape. The same mechanism is likewise employed to stop operation of the compressor 10. In this figure, 42 and 43 designate levers of the first and second classes respectively, these levers having common ends thereof connected by a link 44 and having power applied thereto by a pair of sylphon bellows 45 and 46 between which the lever is connected. Sylphon bellows 45 and 46 are respectively connected to the lower and upper ends of the associated coils 11 and 12, a liquid seal 47 being preferably disposed between each bellows 46 and the associated coil at the point of connection of the bellows with the coil so that no liquid may enter this connection and thus place the head corresponding to the head of the coil against the bellows 46. The sylphon bellows 45 and 46 being similarly disposed with respect to their associated levers 42, 43 it follows that each bellows 45 will urge the link-connected end of its lever in the direction indicated by the arrow with a force equal to the head represented by the amount of liquid in the associated coil. Link 44 is, therefore, urged in this direction by the combined heads. This link has secured thereto a latch element 48 engaging a co-acting latch element 49 which forms one arm of a bell crank lever, the other arm of which is weighted at 50 or otherwise biased to resist movement of link 44 with a force sufficient to maintain the link stationary. Obviously, if the amount of refrigerant contained in coils 11, 12 reduces beyond a predetermined point, this bias means 50 will act to urge the lever to the left in Fig. 1, thus releasing the latch element 49 and permitting the bell crank to rotate under the influence of the bias means. Through rotation of the bell crank, by means of suitable link and lever connections generally designated at 51, the dampers 31 and 32 are caused to reverse their positions, the dampers 31 closing as the dampers 32 open. Rotation of the bell crank lever, furthermore, operates a switch generally designated at 52, opening the circuit of motor 40 while maintaining the circuit of the motor 39 and likewise closing a bell or signal circuit 53.

Figure 6:
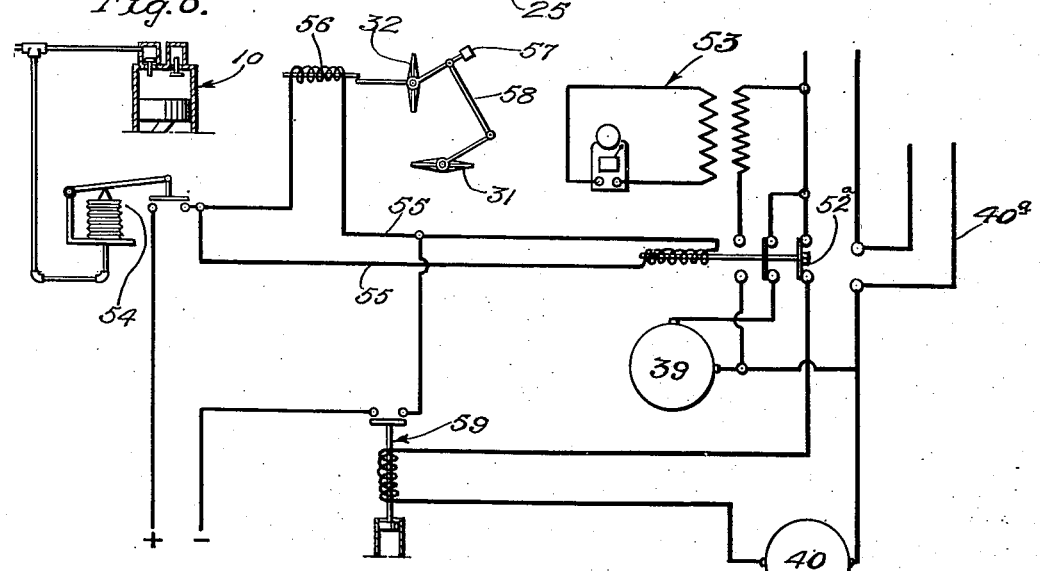
Fig. 6 is a diagrammatic view showing electrically-controlled means for preventing the transmission of toxic gases to the area the temperature of which is being regulated.

As shown in Fig. 6, the damper control is effected electrically. In this figure the exhaust of the compressor through a pressure switch 54 closes a circuit 55 including a solenoid-operated trigger 56 and a solenoid-operated switch 52—a corresponding to the switch 52 hereinbefore referred to. Trigger 56 when operated releases a bias means 57 by which, through link and lever connections 58, the dampers 31 and 32 are operated. In order that the control circuit 55 may not become effective as a result of compressor shut-downs, this circuit preferably likewise includes a slow-closing quick-opening switch 59 which is operated by the circuit of motor 40.

In order that the coil 11 may offer a maximum efficiency in heat transfer and at the same time be so constructed that it may be readily flooded in those periods when it is acting as a cooling coil, this coil is preferably formed in a plurality of banks 11—a, 11—b and 11—c, of which the primary sections of those sections which are connected directly to the trap are separated from the ultimate section 11—c, by liquid seals 60, there being connections 61 and 62 between the upper ends and lower ends of the banks with the seals 60 disposed in these connections between the ultimate coil and the next adjacent coil. A by-pass connection 63 connects the connections 61 between the lower end of bank 11—c and the upper end of the next adjacent bank with the result that gases passing through coil 11—c may pass upwardly to the upper connection 61 and thus reach coils 11—a and 11—b. Any liquid which condenses in coil 11—c during the period when the coil 11 is operating as a condenser may pass through liquid seal 60 of the lower connection 62. These seals will not, however, interfere with complete flooding of the banks when the coil 11—a is operating as an evaporator. The banks 11—a and 11—b are so disposed that the air circulated through the casing is initially passed therethrough; with the result that the cool air is in banks 11—a and 11—b, warmed prior to its contact with the super-heated zone as represented by the bank 11—c. A maximum heat exchange is thus afforded. Thermostat 37 is preferably of the double circuit type and acts through one circuit 36—a to control action of damper 36 and open the same at and above a predetermined temperature and to discontinue operation of motors 39 and 40 at a second and higher predetermined temperature.

Attention is directed to the fact that the slug trap is disposed below, or substantially entirely below, the level of both coils and is so positioned that it is subjected to the greatest depression existing in the system. The low pressure against the liquids accumulated in the trap taken together with the heat to which the trap is subjected during operation of the compressor insures gasification of these liquids and their return to useful circulation in the system.

In use of a single trap such as that suggested in Fig. 7 and shown in detail in Figs. 4 and 5, it is often necessary to employ a small vent 19—a for the main chamber 19 to prevent the trap from becoming gas bound. Such vent is preferably connected to a high point in the system, this point being at present illustrated as the discharge connection of compressor 10.

It will be obvious that the refinements afforded by the construction hereinbefore set forth will permit the apparatus to be practically employed as a medium for controlling the temperature of a given area when either heating or cooling the same. It will also be obvious that this arrangement is capable of a considerable range of change and modification without in any manner departing from the spirit of the invention; I, accordingly, do not wish to be limited thereto except as hereinafter claimed.

I claim:

1. The combination in refrigerating apparatus of two evaporator-condenser coils, a compressor connected between corresponding ends of the coils arranged to selectively draw from either of said coils and discharge to the other thereof, and a single permanent connection between the opposite ends of the coils including a pair of traps disposed back to back permitting passage of liquid through the connection in either direction while preventing passage of gas in either direction.

2. In combination with a refrigerating apparatus including a pair of coils and a compressor arranged in closed cycle to alternately gasify and condense a liquid refrigerant and a motor to operate said compressor, means controlled by the discharge pressure of the compressor to render the motor inoperative, and means to render the first-named means inoperative for a predetermined interval after initiation of operation of said motor.

3. In combination with a refrigerating apparatus including a pair of coils and a compressor arranged in closed cycle to alternately gasify and condense a liquid refrigerant and a motor to operate said compressor, means operative upon a reduction of the discharge pressure of the compressor to render the motor inoperative, and means to render the first-named means inoperative for a predetermined interval after initiation of operation of said motor.

4. In combination with a refrigerating apparatus including a pair of coils and a compressor arranged in a closed cycle to alternately gasify and condense a liquid refrigerant and an electrical motor to operate said compressor, a circuit for said motor, a switch controlling said circuit, a normally open circuit to operate said switch, means operated by a reduction in the discharge pressure of the compressor to close said control circuit, and means to render the control circuit inoperative during initial operation of the motor.

5. In combination with a refrigerating apparatus including a pair of coils and a compressor arranged in a closed cycle to alternately gasify and condense a liquid refrigerant and an electrical motor to operate said compressor, a circuit for said motor, a switch controlling said circuit, a normally open circuit to operate said switch, means operated by a reduction in the discharge pressure of the compressor to close said control circuit, and a slow-closing quick-opening switch in the control circuit and operating means therefor in the motor circuit.

6. In means for controlling the temperature of a given area, means for circulating air in said area including a casing in closed series with said area, a blower in said casing, a coil through which air moving under influence of the blower passes, a circulation system for circulating a fluid through said coil, a normally closed vent for said casing discharging exteriorly to said area, and means controlled by the fluid in said circulation system for automatically terminating circulation of fluid in said system and discharge of air from the casing to said area during continued operation of the blower, said means likewise opening said vent.

7. A device as set forth in claim 6 wherein the circulation system of the coil includes a motor-operated pump, a motor operating said blower, circuits for said motor, a common switch controlling said circuits, a means controlled by the fluid in the circulation system actuating said switch to open the circuit of the pump motor while maintaining the circuit of the blower motor.

8. In means for controlling the temperature of a given area, means for circulating air in said area including a casing having an inlet and an outlet in communication with the area, a normally open damper in said outlet, a vent for the casing discharging exteriorly to said area, a normally closed damper in said vent, a blower in said casing, a coil through which air moving under influence of the blower passes prior to discharge from the casing, a circulating system for circulating a fluid through said coil, and means controlled by the loss of fluid from said circulation system for automatically reversing the positions of said dampers.

9. In means for controlling the temperature of a given area, means for circulating air in said area including a casing having an inlet and an outlet in communication with the area, a normally open damper in said outlet, a vent for the casing discharging exteriorly to said area, a normally closed damper in said vent, a blower in said casing, a coil through which air moving under influence of the blower passes prior to discharge from the casing, a circulating system for circulating a fluid through said coil, and means controlled by the loss of fluid from said circulation system for automatically reversing the positions of said dampers and terminating circulation of fluid in said system.

10. A device as set forth in claim 8 wherein the circulation system of the coil includes a motor-operated pump, a motor operating said blower, circuits for said motor, a common switch controlling said circuits, a means controlled by the fluid in the circulation system actuating said switch to open the circuit of the pump motor while maintaining the circuit of the blower motor.

11. A device as set forth in claim 9 wherein the circulation system of the coil includes a motor-operated pump, a motor operating said blower, circuits for said motor, a common switch controlling said circuits, a means controlled by the fluid in the circulation system actuating said switch to open the circuit of the pump motor while maintaining the circuit of the blower motor.

12. The combination in refrigerating apparatus of two evaporator-condenser coils, a compressor connected between corresponding ends of the coils arranged to selectively draw from either of said coils and discharge to the other thereof, a main chamber, chambers at opposite sides of the main chamber and communicating with the main chamber through a port, check valve means controlling said ports to prevent passage of fluids from the main chamber through the port, a pair of orifices, one establishing communication between the main chamber and each of the last-named chambers, a float ball in the main chamber and in the absence of liquid in the chamber positioned to seal either of said orifices upon the introduction of pressure through the other thereof, a connection between the last-named chambers and the opposite ends of said coils, and a vent connection between said main chamber and a high point in the apparatus.

13. The combination in refrigerating apparatus of two evaporator-condenser coils, a compressor connected between corresponding ends of the coils arranged to selectively draw from either of said coils and discharge to the other thereof, a main chamber, chambers at opposite sides of the main chamber and communicating with the main chamber through a port, check valve means controlling said ports to prevent passage of fluids from the main chamber through the port, a pair of orifices, one establishing communication between the main chamber and each of the last-named chambers, a float ball in the main chamber and in the absence of liquid in the chamber positioned to seal either of said orifices upon the introduction of pressure through the other thereof, a connection between the last-named chambers and the opposite ends of said coils, and a vent connection between said main chamber and the discharge of the compressor.

14. The combination in refrigerating apparatus comprising a pair of coils and a compressor disposed in a series for the circulation of a fluid medium and a slug trap connected with the intake of the compressor, said trap being disposed below the level of the coils and positioned to be subjected to the heat generated in operation of the compressor.

15. The combination in refrigerating apparatus comprising a pair of coils and a compressor disposed in a series for the circulation of a fluid medium and a slug trap connected with the intake of the compressor, said trap being positioned to be subjected to the heat generated in operation of the compressor.

16. In means for controlling the temperature of a given area, means for circulating air in said area including a casing in closed series with said area, a blower in said casing, a coil through which air moving under influence of the blower passes, a circulation system for circulating a fluid through said coil, a normally closed vent for said casing discharging exteriorly to said area, and means controlled by the fluid in said circulation system for automatically terminating discharge of air from the casing to said area during continued operation of the blower, said means likewise opening said vent.

17. In combination with a casing having an inlet and an outlet, a blower in said casing, a refrigerant compressor in said casing between the outlet of the casing and said blower, a circulation system for the compressor including a coil disposed in said casing between the blower and the compressor, and a damper controlled by-pass whereby the blower discharge may partially by-pass the coil.

18. A device as claimed in claim 17 wherein means are provided for selectively connecting the terminal of said coil which communicates with the compressor with the intake or exhaust of the compressor.

19. In combination, air conditioning means comprising a casing, said casing having an inlet and an outlet, means for circulating air through the casing, a refrigerant compressor and driving motor therefor in said casing, and a circulation system for the compressor including a coil disposed in said casing, the motor compressor group being disposed between the outlet of the casing and the coil.

20. A heat pump cycle including a refrigerant circulation coil disposed in an air stream to be conditioned and comprising a plurality of banks arranged in series in said air stream and in parallel in said heat pump cycle, the bank last engaged by said air stream being directly connected to the refrigerant circulation means of the heat pump cycle and having connection with the succeeding banks, permitting the transfer of liquid to said succeeding banks from either end of the first-named bank while permitting transfer of gases only from the lower end of the first-named bank to the upper ends of the succeeding banks.

21. A device as claimed in claim 20 in which the circulation means of the heat pump cycle comprises a compressor over which the air stream passes after passage over the coil and prior to delivery to an area to be conditioned.

22. A reversible heat pump cycle including refrigerant circulation coils, one of which is disposed in an air stream to be conditioned, said coil comprising a plurality of banks arranged in series in said air stream and in parallel in said heat pump cycle, the bank last engaged by air circulated in said stream being directly connected to the refrigerant circulation means of the heat pump cycle, and having connection with the succeeding banks, permitting the transfer of liquid to said succeeding banks from either end of the first-named bank while permitting transfer of gases only from the lower end of the first-named bank to the upper ends of the succeeding banks.

23. A device as claimed in claim 22 in which the circulation means of the heat pump cycle comprises a compressor and driving motor therefor over which the air of the stream passes after passage over the coil and prior to delivery to an area to be conditioned.

24. In combination, air conditioning means comprising a casing, said casing having an inlet and an outlet, means for circulating air through the casing, a refrigerant compressor in said casing, a circulation system for the compressor including a coil disposed in said casing, the compressor being disposed between the outlet of the casing and the coil, and means for selectively connecting the terminal of said coil which communicates with the compressor with the intake or exhaust of the compressor.

25. In combination, air conditioning means comprising a casing, said casing having an inlet and an outlet, means for circulating air through the casing, a refrigerant compressor in said casing, a circulation system for the compressor including a coil disposed in said casing, the coil comprising a plurality of banks arranged in series between the inlet and outlet of the casing, the bank most remote from the inlet of the casing being directly connected to the compressor, and means for selectively connecting the terminal of said coil which communicates with the compressor with the intake or exhaust of the compressor.

26. In combination with a casing having an inlet and an outlet, a blower in said casing, a refrigerant compressor in said casing between the outlet of the casing and said blower, a circulation system for the compressor including a coil disposed in said casing between the blower and the compressor, and means for selectively connecting the terminal of said coil which communicates with the compressor with the intake or exhaust of the compressor.

27. A heat pump cycle including a refrigerant circulation coil disposed in an air stream to be conditioned and comprising a plurality of banks arranged in series in said air stream and in parallel in said heat pump cycle, the bank last engaged by said air stream being directly connected to the refrigerant circulation means of the heat pump cycle, and means for selectively connecting the terminal of said coil which communicates with the compressor with the intake or exhaust of the compressor.

28. A heat pump cycle including a refrigerant circulation coil disposed in an air stream to be conditioned and comprising a plurality of banks arranged in series in said air stream and in parallel in said heat pump cycle, the bank last engaged by said air stream being directly connected to the refrigerant circulation means of the heat pump cycle and having connection with the succeeding banks, permitting the transfer of liquid to said succeeding banks from either end of the first-named bank while permitting transfer of gases only from the lower end of the first-named bank to the upper ends of the succeeding banks, and means for selectively connecting the terminal of said coil which communicates with the compressor with the intake or exhaust of the compressor.

29. A heat pump cycle including a refrigerant circulation coil disposed in an air stream to be conditioned and comprising a plurality of banks arranged in series in said air stream and in parallel in said heat pump cycle, the bank last engaged by said air stream being directly connected to the refrigerant circulation means of the heat pump cycle, the circulation means of the heat pump cycle comprising a compressor over which the air of the circulation system passes after passage over the coil and prior to delivery to an area to be conditioned.

30. A reversible heat pump cycle including refrigerant circulation coils, one of which is disposed in an air stream to be conditioned, said coil comprising a plurality of banks arranged in series in said stream and in parallel in said heat pump cycle, the bank last engaged by air circulated in said air stream being directly connected to the refrigerant circulation means of the heat pump cycle, the circulation means of the heat pump cycle comprising a compressor over which the air of the stream passes after passage over the coil and prior to delivery to an area to be conditioned.

GILBERT WILKES.